July 29, 1924.
W. A. ANTILOTTI ET AL
1,503,342
DEMOUNTABLE RIM LUG
Filed June 21, 1921
3 Sheets-Sheet 1
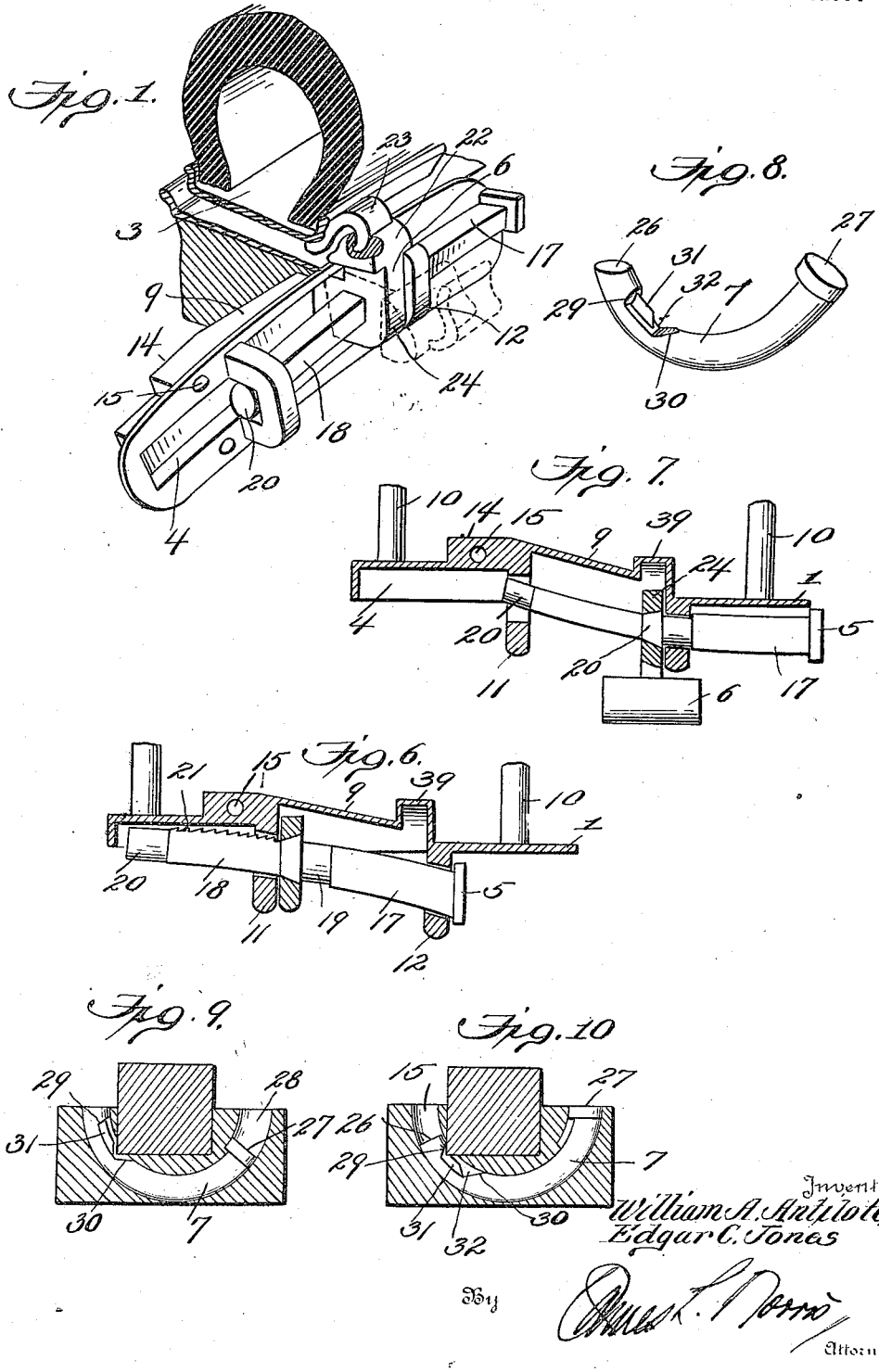

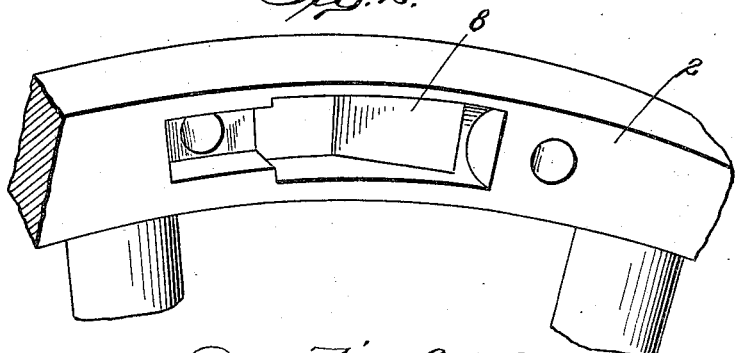
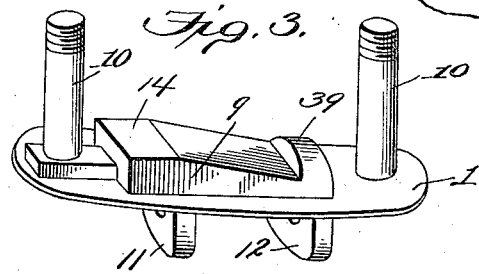
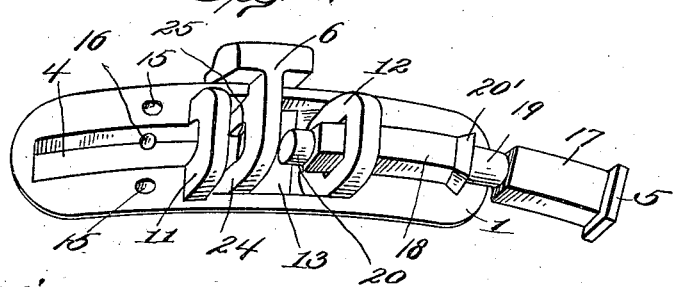
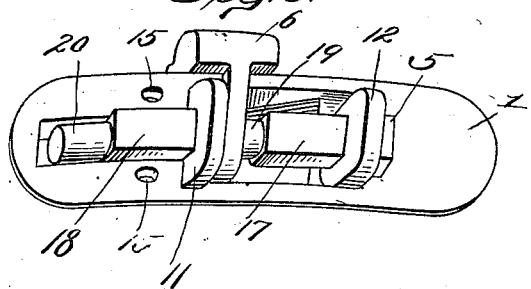

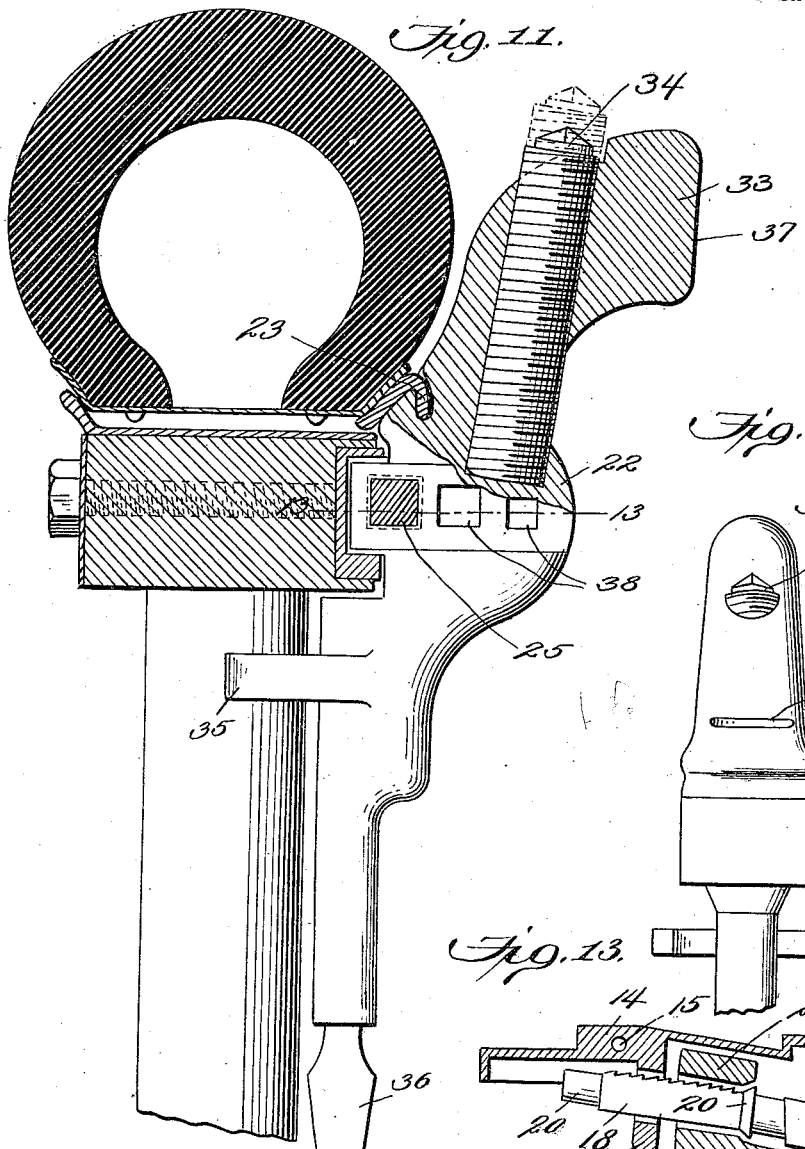

Patented July 29, 1924.

1,503,342

UNITED STATES PATENT OFFICE.

WILLIAM A. ANTILOTTI AND EDGAR C. JONES, OF ATLANTA, GEORGIA.

DEMOUNTABLE-RIM LUG.

Application filed June 21, 1921. Serial No. 479,289.

*To all whom it may concern:*

Be it known that we, WILLIAM A. ANTILOTTI and EDGAR C. JONES, citizens of the United States, residing at Atlanta, in the county of De Kalb and State of Georgia, have invented new and useful Improvements in Demountable-Rim Lugs, of which the following is a specification.

This invention relates to a mechanism for securing a demountable rim on a vehicle and has for one of its objects to provide a securing device for demountable rims in which the holding means or lug is positioned into engagement with the rim by a mechanical movement other than the screw.

Another object of our invention is to provide a device of this character in which the securing means for the lug is locked against accidental displacement.

Another object of the invention is the provision of a lug for demountable rims that will progressively find a new seat on the rim as the engaging parts become worn.

A further object of our invention is the provision of a lug for demountable rims having a portion extended to afford auxiliary traction to the wheel on which it is mounted.

A still further object of our invention is a rim lug which is formed with a variety of tool surfaces so that when carried as a spare part it will be useful as a handy tool.

Other objects will be disclosed as the description develops.

In the accompanying drawings which form a part of this specification—

Figure 1 is a view in perspective of part of an automobile wheel provided with our improved rim lug.

Figure 2 is a perspective view of the felly of the wheel showing the counter-sunk recess in which is seated the base plate of the device.

Figure 3 is a perspective view of the rear of the base plate which occupies the recess shown in Figure 2.

Figure 4 is a perspective view of the device showing the lug and bolt in disassembled relation.

Figure 5 is a view of the parts shown in Figure 4 with the lug in tightened position.

Figure 6 is a view in cross section of the device when the parts are in the position shown in Figure 5.

Figure 7 is a view of the same device with the bolt withdrawn and turned with the lug in the dotted line shown in Figure 1.

Figure 8 is a perspective illustration of the locking means by which the bolt is held after having been pushed into tightening engagement with the lug.

Figures 9 and 10 show respectively the locking means out of and in engagement with the bolt.

Figure 11 shows a modified form of rim lug in which portions of its contour are differentiated into auxiliary tractive means and tool elements.

Figure 12 is a view of a portion of the lug taken at right angles to the plane of Figure 11.

Figure 13 is a cross sectional view of the lug taken along the line 13—13 of Figure 12 in which the arrow indicates the tractive thrust in a direction which tightens the lug against the rim.

Referring to the drawings, the invention in general comprises the plate 1, secured to the felly 2 of an automobile wheel having a demountable rim 3. The front of the plate is provided with an inclined guideway 4 through which slides a bolt 5, the path of the bolt making an acute angle with the face of the felly.

On the bolt 5 is a lug 6 which slides with the bolt as the latter is pushed along the inclined guideway, this action operating at the same time to cause the lug to move inwardly toward the felly into contact with the demountable rim. When the bolt is pushed or driven in as far as the forcible engagement of the lug with the rim will permit, it is held in place by the interlocking of a transversely movable member 7, with serrations on the end of the bolt 5.

The felly 2 is provided with a counter-sunk recess 8 over which the plate member 1 is mounted. The projecting portion 9 of said plate fits into said recess, the plate 1 being substantially flush with the face of the felly and secured thereto by bolts 10 passing through the felly and held in place by nuts, not shown, on the other side of the felly.

On the front of the face plate 1 as best shown in Figure 4 are the upstanding ears 11 and 12, spaced apart, between which is the struck-in recess 13 the rear of which forms the projecting portion 9 shown in Figure 3. An extension 4 of this recess lies outside the ear 11. Each of the upstanding ears 11 and 12 is provided with a polygonal aperture and it will be noted from Figure 6 that the bottom of recess 4 and the lower sides of the apertures in the ears 11 and 12 are progressively elevated, the three elements together thus forming an inclined guide. The aperture in the ear 11 is of the same width as the recess 4 and the aperture in the ear 12 is somewhat larger.

The plate 1 is provided with a thickened portion 14 having a curved cylindrical bore 15, best shown in Figure 9 which is so placed as to break into or intersect the angle at one side of the bottom of the recess 4 as shown at 16. The object of this will be presently set forth.

The bolt 5 which is designed to pass through the apertured ears and the recess 4 is preferably curved in an arc which follows the curvature of the felly and the co-acting surface of the guide elements are similarly curved. The head end of the bolt 5 is polygonal for a portion of its length as at 17 and fits the aperture in the ear 12. Another portion as at 18 is polygonal but of smaller cross section. Between the two polygonal portions of the bolt is a cylindrical portion 19 of smaller diameter and the end of the bolt remote from the head is also cylindrical as shown at 20. The cylindrical portions are spaced the same distance as the ears 11 and 12. When the bolt is in such position that its polygonal portions are in the polygonal apertures in the respective ears it cannot be rotated, but when it is withdrawn so that the cylindrical portions are in the ears it may be turned. To facilitate the turning of the bolt at right angles to its normal position, it is curved also in a plane at right angles to its normal plane of curvature. Adjacent one end of the polygonal portion 18 of the bolt 5 is a collar 20' small enough to go through the aperture of the ear 12 and normally located somewhere in the space between the two ears. This collar is beveled on the side next to the polygonal portion 18. One edge of the polygonal portion 18 is serrated crosswise as shown at 21 in Figure 6. This edge lies across the opening 16 in the angle of the recess 4 and the serrations are engaged by a projection on a member acting through said aperture and are held in interlocking co-relation.

Slidably mounted on the polygonal portion 18 and lying between the ears 11 and 12 is a rim lug 6, which comprises a head portion 22 recessed at the top to hold a flexible cushioning strip 23 adapted to lie between the lug and the rim when the former is tightened. Depending from the head 22 is the ear 24 having a polygonal aperture 25 which fits the polygonal portion 18 and has the side of the aperture facing the collar 20 chamfered in a manner similar to the collar. As the bolt is slid or pushed into the guideway it will slide through the aperture 25 in the ear 24 until the collar 20 finds a seat within the aperture 25. Thereafter the bolt will carry the lug along with it and since the former is traveling in a path inclined toward the surface of the felly, the lug will as it progresses be forced inwardly against the demountable rim.

The locking device for holding the bolt 5 in closed position comprises a bar 7 which is curved upon itself so that both ends 26 and 27 can be reached and manipulated from the outside of the wheel. This bar reciprocates in a guideway 15 and both bar and guideway are curved in an arc of a circle except at one end where the guideway is countersunk on one side into an enlarged chamber 28 and the bar adjacent one end thereof is sprung out of the circular arc into said enlarged chamber and is designed to offer frictional resistance to movement due to its resiliency when pushed into the circular portion of said guideway. The bar 7 is machined at that portion of itself which will be exposed through the opening 16, to provide the abutments 29 and 30 which limit its movement in either direction when the bolt 5 is in place as clearly shown in Figures 9 and 10. A longitudinal edge 31 is also formed to engage between the serrations on the bolt 5 when the end 26 of the bar is pushed in. There is also formed a transverse V-shaped passage 32 which will permit the bar 7 to clear the bolt when the end 27 of the latter is pushed in, so that the bolt may then be readily withdrawn.

It will be observed that the bar 7 cannot drop out while the bolt is in place, due to the limitation of movement imposed by the presence of the bolt between the abutments 29 and 30 and that the bolt cannot be inadvertently unlocked as the sprung portion of the bar 7 prevents said bar from voluntarily re-entering the circular passage 15.

The operation of the device is simple. Assuming that it is desired to remove the rim, the head 27 of the bar 7 is pressed inwardly as far as it will go against the tension of the sprung portion of said bar. This releases the edge 31 from engagement with the serrated edge of the bolt. The latter is then withdrawn until the cylindrical portions 19 and 20 register with the apertures in the ears 11 and 12. The lug may then be readily jarred loose and moved manually to an extreme position against the ear 12. The bolt is then turned at right angles carrying with it the lug 6 which will then be in the dotted line position shown in Figure 1. The rim may then be slipped over the lug and removed. To accommodate the ear 24 when the lug is in this position, the recess back of said lug is expanded into an enlarged space 39. The parts may be tightened by a mere reversal of the loosening operation, except that the lug will be carried back by the collar 20 as the bolt is pushed in, the final step being to repress the end 26 of the bar 7, which thrusts the edge 31 between the serrations on the edge of the bolt and expands the sprung portion of the bar 7 into the enlargement 28.

In the form shown in Figure 11, the lug 22 is expanded into a traction hook 33 which is adapted to engage the road when the tire becomes sunk in heavy sand or mud thereby giving auxiliary traction to the tire. In this modification the lug 22 is provided with a socket in which is threaded an adjustable traction point 34 which may be advanced or retracted to meet varying road conditions. The lug is reinforced by clasping members 35 made integral therewith which are adapted to partly encircle a spoke of the wheel. The surface of this lug is further differentiated by being formed into various tool elements comprising a screw-driver 36, a hammer surface 37 and wrench sockets 38. When the device is not in use as a rim lug the aperture 25 may also be used as a wrench socket.

It is to be understood that the lug shown in this modification is locked in place by the same mechanism as is shown in our preferred embodiment illustrated in Figures 1 to 10 inclusive and that the securing device is placed on the wheel with such relation to the direction of the tractive thrust, that the push of the traction hook 33 against the ground will tend to drive the ear 24 of the lug 22 away from the collar 20 against which it normally seats and slide it along the polygonal portion 18 of the bolt into still more forcible engagement with the rim.

In either form of our invention it will be apparent that the tightening operation causes bodily longitudinal movement of the lug along the edge of the rim. Thus as the parts wear, the lug will progressively move to a new seat on the rim at each operation of tightening. It is obvious that no wrench or special tool is required for either loosening or tightening the lug. Even an ordinary rock from the roadside is adequate to jar the bolt 5 loose or drive it home, after the member 7 has been disengaged from the serrations in said bolt.

It is evident that those skilled in the art may vary the details of construction as well as the arrangement of parts without departing from the scope of the invention and therefore we do not wish to be limited to the above disclosure except as may be required by the appended claims.

Having described our invention what we claim as new and desire to secure by Letters Patent, is:—

1. In combination a felly, a demountable rim therefor, a plurality of lugs for securing said rim mounted on said felly and constructed to swing outwardly in a plane at right angles to the longitudinal plane of said felly, means slidable longitudinally in either direction to respectively tighten and loosen said lugs.

2. In combination a felly, a demountable rim therefor, securing means for said rim including a lug, means for sliding said lug longitudinally into engagement with the rim and means for locking the said lug in engaged position.

3. In combination a felly, a demountable rim therefor, securing means including a base plate mounted on said felly, a guideway on said plate inclined toward said felly, a bolt slidable in said guideway, and a lug mounted on said bolt, said lug being drawn into contact with the rim by sliding movement of said bolt.

4. In combination a felly, a demountable rim therefor, securing means including a base plate mounted on said felly, a plurality of spaced parts each having an aperture therethrough, said apertures being progressively elevated above the surface of the base plate forming a guideway inclined toward said felly, a bolt passing through said apertured parts arranged slidably thereto, a lug mounted on said bolt between said apertured parts adapted to make forcible engagement with the rim when the bolt is slid in said guideway.

5. In combination a felly, a demountable rim therefor, securing means on said felly including a lug, a guideway, a bolt slidable in said guideway, said bolt being so shaped in relation as to its guideway to be non-rotatable relative thereto during a part of its travel and to be rotatable thereto to another part of its travel, said lug being non-rotatably mounted on said bolt.

6. A demountable rim securing device comprising a plate adapted to be mounted on the felly of the wheel, an inclined guide on said plate making an acute angle with the longitudinal plane of said felly, a bolt slidable in said guide, a rim lug mounted on said bolt and slidable therewith.

7. In combination with a felly, a demountable rim therefor, rim securing means including a plate mounted on the felly and provided with a guide inclined toward the felly, a member slidable in the guide carrying a lug, said lug making forcible engagement with the rim when the member is slid inwardly along said guide.

8. In combination a felly and a demountable rim therefor, a rim securing means mounted on said felly including a lug, tightening means for said lug constructed to cause said lug to seat progressively on different portions of the rim to compensate for wear on engaging surfaces.

9. In a device of the character described, a base plate provided with a recess, and provided with a bore intersecting said recess, a detent movable in said bore provided with a locking element arranged to enter said recess at the point of intersection, a bolt slidable in said recess engaged by said locking element and a rim lug mounted on said bolt.

10. In a device of the character described, a base plate provided with a recess, upstanding ears each having an aperture in longitudinal alignment with said recess, said base plate being provided with a bore intersecting said recess, a detent movable in said bore provided with a locking element arranged to enter said recess at the point of intersection, a bolt slidable in said recess engaged by said locking element and a rim lug mounted on said bolt.

11. In a device of the character described, a base plate provided with a recess, upstanding ears each having an aperture in longitudinal alignment with said recess, said base plate being provided with a bore intersecting said recess, a detent movable in said bore provided with a locking element arranged to enter said recess at the point of intersection, a bolt slidable through said apertured ears into said recess and engaged by said locking element, and a rim lug mounted on said bolt.

12. In a device of the character described, a base plate provided with a recess, upstanding ears each having an aperture in longitudinal alignment with said recess, said base plate being provided with a bore intersecting said recess, a detent movable in said bore provided with a locking element arranged to enter said recess at the point of intersection, a bolt slidable through said apertured ears and into said recess, adapted to be engaged by said locking element, and a rim lug mounted on said bolt between said ears.

13. In a device of the character described, a base plate provided with a recess, upstanding ears each having an aperture in longitudinal alignment with said recess, said base plate being provided with a bore intersecting said recess, a detent movable in said bore provided with a locking element arranged to enter said recess at the point of intersection, a bolt slidable through said apertured ears into said recess engaged by said locking element and a rim lug non-rotatably mounted on said bolt between said ears.

14. In a device of the character described, a base plate provided with a recess, upstanding ears each having an aperture in longitudinal alignment with said recess, said base plate being provided with a bore intersecting said recess, a detent movable in said bore provided with a locking element arranged to enter said recess at the point of intersection, a bolt slidable through said apertured ears into said recess engageable with said locking element, a collar on said bolt and a rim lug mounted on said bolt and engaged by said collar.

15. In a device of the character described, a felly, a demountable rim therefor, base plates mounted on the felly provided with elongated recesses, spaced ears rising from said base plates in longitudinal alignment with said recesses, each provided with a polygonal aperture therethrough, the bottoms of said recesses and the lower side of each of the apertures being progressively elevated, and the lateral surface of each of said recesses and apertures being curved with the curvature of the felly, said base plates being provided with curved bores arranged transversely of the recesses having their ends opening on the front of the base plates, said bores intersecting said recesses, curved detents reciprocable in said bores, means on said detents extensible into said recesses at the point of intersection when the detents are reciprocated in one direction, and withdrawable when said detents are moved in the other direction, bolts slidable through said apertured ears and into the recesses, said bolts having polygonal portions fitting the apertures in the respective ears and having cylindrical portions, said cylindrical portions being spaced apart the distance of the ears, the apertured ears and polygonal portions of the bolts cooperating to prevent rotation of the bolts when the polygonal portions are within the ears, said bolts being rotatable when the cylindrical portions are within the ears, lugs slidably mounted on said bolts, collars on the bolts engageable with the lugs, means on the bolts in position to be engageable with the extensible portions of the detents when the bolts are at one extreme position, said bolts being curved in two planes at right angles to each other, the degree of curvature in the planes being equal to the curvature of the felly.

16. In combination a felly, a demountable rim therefor, securing means including a base plate mounted on said felly, a plurality of spaced ears each having a polygonal aperture therethrough, said apertures being progressively elevated above the surface of the base plate forming a guideway inclined toward said base plate, a bolt mounted for slidable movement in said apertures having portions of its length polygonal in cross section and fitting said apertures to prevent rotation of said bolt, and cylindrical portions adapted to be drawn in registry with said apertures when the bolt is at the limit of movement in one direction to permit rotation of the latter, a lug non-rotatably mounted upon said bolt, said lug being movable into engagement with the rim when the bolt is slid inwardly of the guideway and rotatable with the bolt when the lug and bolt are slid outwardly to an extreme position.

17. In a device of the character described, a rim lug, means for forcing said lug against a rim and means for locking said forcing means comprising a guide curved in the arc of a circle, said guide being intersected transversely by the path of said forcing means, a reciprocable detent in said guide provided with means to engage said forcing means when the detent is moved in one direction and provided with a passage to permit said detent to avoid engagement with said forcing means when it is moved in the other direction.

18. In a device of the character described, a base plate, a bolt guide in said base plate, said base plate being provided with a bore curved in the arc of a circle transversely intersecting said bolt guide, a reciprocable detent in said bore having an engaging element and a passage selectively presentable at the point of intersection by reciprocating said detent, a bolt adapted to slide in said guide past the point of intersection when the passage in the detent is in registry with the point of intersection and means on the bolt cooperating with the engaging element of the detent to lock said bolt when the engaging element is moved into registry with the point of intersection.

19. In a device of the character described, a base plate, a bolt guideway in said base plate, said base plate being provided with a bore curved in the arc of a circle and enlarged on one side at one end, said bore intersecting the bolt guideway in a transverse direction, a reciprocable detent in said bore, means on said detent cooperating with the bolt, to limit its motion in either direction, a portion of said detent being sprung out of the arc of a circle within the enlarged portion of the bore.

20. In combination a vehicle wheel, a demountable rim therefor, adjustable means for holding the rim on the wheel and means for applying the tractive force of the vehicle to said means to effect adjustment of said means.

21. In combination a felly provided with a demountable rim, a rim securing device therefor comprising a plate mounted on said felly, a guide mounted on said plate inclined toward said felly, a lug adapted to engage the rim having a part thereof slidably mounted on said guide and means on said lug for tractive engagement with the ground for forcing said lug along said guide into engagement with the rim.

22. A combined rim lug and mud hook comprising in combination a plate adapted to be secured to a felly, a guide on said plate inclined toward said felly, a lug slidably mounted on said guide having a portion for engagement with a demountable rim, a mud hook forming part of said lug adapted by the tractive thrust imposed upon it when in action to wedge the rim portion of said lug against the rim.

23. A device of the character described, comprising a plate adapted to be secured to the felly of a wheel, a lug adapted when the plate is secured to a felly to cooperate with a rim mounted on the felly to secure said rim to the felly, said lug being adapted to swing outwardly in a plane at right angles to the longitudinal plane of the felly when the plate is secured to said felly, means slidable longitudinally in either direction to tighten or loosen said lugs.

24. A device for use in securing a rim to a felly, comprising a plate, a lug, means for sliding said lug longitudinally into engagement with the rim when the plate is mounted on a felly, and means for locking said lug in engaging position.

In testimony whereof we have hereunto set our hands in presence of two subscribing witnesses.

WILLIAM A. ANTILOTTI.
EDGAR C. JONES.

Witnesses:
Le Vale Withers,
Mamie H. Williams.